(12) United States Patent
Kotani

(10) Patent No.: US 8,951,692 B2
(45) Date of Patent: *Feb. 10, 2015

(54) FUEL CELL

(75) Inventor: Takafumi Kotani, Shiki (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 13/824,225

(22) PCT Filed: Oct. 26, 2011

(86) PCT No.: PCT/JP2011/075230
§ 371 (c)(1),
(2), (4) Date: Mar. 15, 2013

(87) PCT Pub. No.: WO2012/081321
PCT Pub. Date: Jun. 21, 2012

(65) Prior Publication Data
US 2013/0177828 A1 Jul. 11, 2013

(30) Foreign Application Priority Data
Dec. 15, 2010 (JP) .................. 2010-278727

(51) Int. Cl.
*H01M 2/38* (2006.01)
*H01M 8/24* (2006.01)
*H01M 8/02* (2006.01)
*H01M 8/12* (2006.01)

(52) U.S. Cl.
CPC .......... *H01M 8/2425* (2013.01); *H01M 8/0247* (2013.01); *H01M 8/1206* (2013.01); *H01M 8/2415* (2013.01); *H01M 8/247* (2013.01); *H01M 8/2485* (2013.01); *H01M 8/249* (2013.01); *Y02E 60/521* (2013.01); *Y02E 60/525* (2013.01)
USPC .......................... 429/457; 429/495; 429/512

(58) Field of Classification Search
USPC ........................ 429/457, 495, 512
See application file for complete search history.

(56) References Cited

U.S. PATENT DOCUMENTS

| 8,530,107 | B2 * | 9/2013 | Ogawa et al. ............... 429/456 |
| 2007/0111068 | A1 | 5/2007 | Gudlavalleti et al. |
| 2011/0076586 | A1 * | 3/2011 | Homma et al. ............... 429/457 |
| 2011/0151348 | A1 | 6/2011 | Murakami et al. |

FOREIGN PATENT DOCUMENTS

| JP | 2006-120589 | 5/2006 |
| JP | 2007-317594 | 12/2007 |
| JP | 2007-329063 | 12/2007 |
| WO | 2009/093622 | 7/2009 |

* cited by examiner

*Primary Examiner* — Jane Rhee
(74) *Attorney, Agent, or Firm* — Rankin, Hill & Clark LLP

(57) ABSTRACT

A separator of a fuel cell includes sandwiching sections that sandwich electrolyte electrode assemblies therebetween, bridge sections, and a reactant gas supply section. The electrolyte electrode assemblies are sandwiched between the sandwiching sections. A fuel gas channel and an oxygen-containing gas channel are formed in each of the sandwiching sections. A fuel gas supply channel, a fuel gas return channel, and an oxygen-containing gas supply channel are formed in each of the bridge sections. A fuel gas supply passage, a fuel gas discharge passage, and an oxygen-containing gas supply passage extend through the reactant gas supply section.

15 Claims, 11 Drawing Sheets

FUEL CELL

TECHNICAL FIELD

The present invention relates to a fuel cell formed by stacking an electrolyte electrode assembly between separators. The electrolyte electrode assembly includes an anode, a cathode, and an electrolyte interposed between the anode and the cathode.

BACKGROUND ART

Typically, solid oxide fuel cells (SOFC) employ an electrolyte made up of an ion-conductive solid oxide such as stabilized zirconia. The electrolyte is interposed between an anode and a cathode to form an electrolyte electrode assembly (MEA). The electrolyte electrode assembly is sandwiched between a pair of separators (bipolar plates). In use, generally, a predetermined number of separators and electrolyte electrode assemblies are stacked together to form a fuel cell stack.

In the fuel cell, in order to supply a fuel gas such as a hydrogen-containing gas, and an oxygen-containing gas such as air to the anode and the cathode of the electrolyte electrode assembly, respectively, a fuel gas channel and an oxygen-containing gas channel are formed along surfaces of the separators.

For example, as shown in FIG. 9, a flat plate stacked type of fuel cell, as disclosed in Japanese Laid-Open Patent Publication No. 2006-120589, includes a separator 1a stacked on a power generation cell. The separator 1a includes left and right manifold parts 2a, a central part 3a where the power generation cell is provided, and connector parts 4a that interconnect the left and right manifold parts 2a and the central part 3a. The connector parts 4a are flexible.

Further, as shown in FIG. 10, a fuel cell stack, as disclosed in Japanese Laid-Open Patent Publication No. 2007-317594, is formed by alternately stacking cells 1b and separators. Each of the separators includes a cathode plate member 2b and an anode plate member 3b.

The separator has an internal manifold structure including a fuel electrode supply manifold 4b for supplying a fuel gas to a fuel electrode, an air electrode supply manifold 5b for supplying an oxygen-containing gas to an air electrode, and a fuel gas discharge manifold 6b for discharging unconsumed fuel gas as well as consumed fuel gas as an exhaust gas.

Two cells 1b are placed in cell holders 7b. The fuel electrode supply manifold 4b, the air electrode supply manifold 5b, and the fuel gas discharge manifold 6b are interposed between the cell holders 7b.

Further, as shown in FIG. 11, in a separator, as disclosed in Japanese Laid-Open Patent Publication No. 2007-329063, a fuel supply manifold 1c for supplying a fuel gas from the outside, a fuel discharge manifold 2c for discharging the fuel gas to the outside, and an oxygen-containing gas supply manifold 3c for supplying an oxygen-containing gas from the outside are connected to a center plate 7c through pipes 4c, 5c and 6c, respectively. In the separator, fuel gas is supplied and discharged, and oxygen-containing gas is supplied through the pipes 4c, 5c and 6c.

SUMMARY OF INVENTION

In Japanese Laid-Open Patent Publication No. 2006-120589, since the manifold parts 2a are provided on respective left and right sides, the fuel gas and the oxygen-containing gas prior to consumption thereof cannot be heated suitably by heat produced as a result of power generation by the fuel cell. Therefore, a temperature difference between the fuel gas and the oxygen-containing gas, which are supplied to the electrolyte electrode assembly, cannot be reduced. Thus, power generation cannot be performed stably in the electrolyte electrode assembly.

Further, since the manifold parts 2a requiring a high load are spaced from each other, heat stress tends to act on an MEA stack part (central part 3a) although a low load should be applied thereto. Thus, distortion may occur in the separator 1a.

Further, in Japanese Laid-Open Patent Publication No. 2007-317594, the cell holders 7b, which hold the cells 1b, the fuel electrode supply manifold 4b, the air electrode supply manifold 5b, and the fuel gas discharge manifold 6b are provided in combination on the surface of the separator. In such a structure, desired loads cannot be applied independently to each of the cells 1b, to which a relatively low load should be applied, and to the manifolds, to which a relatively high load should be applied.

Further, in Japanese Laid-Open Patent Publication No. 2007-329063, the fuel supply manifold 1c, the fuel discharge manifold 2c, and the oxygen-containing gas supply manifold 3c are spaced separately from each other. In such a structure, heat stress tends to act on an MEA stack part (center plate 7c) although a low load should be applied thereto. Thus, distortion may occur in the separator.

The present invention has been made to solve problems of this type. An object of the present invention is to provide a fuel cell having a simple structure, in which distortion in the separators is suppressed as much as possible, and in which power generation performance, heat efficiency, and durability are improved.

The present invention relates to a fuel cell formed by stacking an electrolyte electrode assembly between separators. Each of the electrolyte electrode assemblies includes an anode, a cathode, and an electrolyte interposed between the anode and the cathode.

In the fuel cell, each of the separators includes a sandwiching section for sandwiching the electrolyte electrode assembly, a bridge section connected to the sandwiching section, and a reactant gas supply section connected to the bridge section. A fuel gas channel for supplying a fuel gas along an electrode surface of the anode, and an oxygen-containing gas channel for supplying an oxygen-containing gas along an electrode surface of the cathode are provided separately in the sandwiching section. A fuel gas supply channel for supplying the fuel gas to the fuel gas channel, a fuel gas return channel for returning the fuel gas that has flowed through the fuel gas channel, and an oxygen-containing gas supply channel for supplying the oxygen-containing gas to the oxygen-containing gas channel are formed in the bridge section. A fuel gas supply passage for supplying the fuel gas to the fuel gas supply channel, a fuel gas discharge passage for discharging the fuel gas that has flowed through the fuel gas return channel, and an oxygen-containing gas supply passage for supplying the oxygen-containing gas to the oxygen-containing gas supply channel extend in a stacking direction through the reactant gas supply section.

In the present invention, all of the fuel gas supply passage, the fuel gas discharge passage, and the oxygen-containing gas supply passage, which make up components of the manifold, are provided in a single reactant gas supply section. In this structure, the components of the manifold, which require a high load for gas sealing, are not positioned distantly from each other. Thus, it is possible to suppress insofar as possible the occurrence of distortion in the separators due to heat expansion or due to heat contraction.

Further, failures in tight contact between the separator and the electrolyte electrode assembly due to distortion are suppressed, and an improvement in power generation performance is achieved. Moreover, since damage to the electrolyte electrode assembly due to distortion is suppressed, durability of the electrolyte electrode assembly can suitably be improved.

Further, the fuel gas supply passage, the fuel gas discharge passage, and the oxygen-containing gas supply passage are provided in the reactant gas supply section, which serves as a reactant gas manifold. The fuel gas supply channel, the fuel gas return channel, and the oxygen-containing gas supply channel are formed in the bridge section. In this structure, as supplied gases, the fuel gas and the oxygen-containing gas tend to be heated easily by hot fuel gas. Thus, advantageously, a thermally self-sustaining operation can be facilitated, and an improvement in heat efficiency can be achieved.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
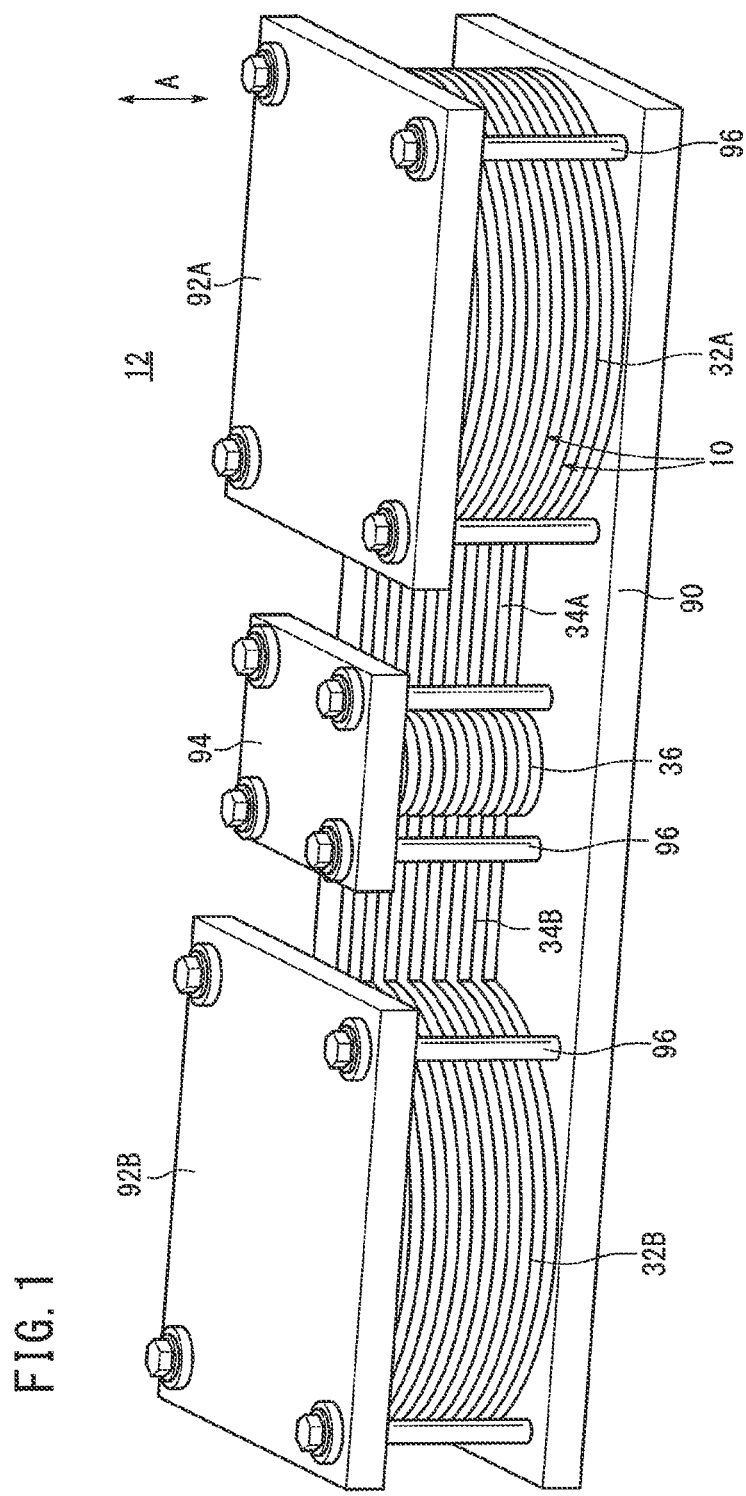
FIG. 1 is a perspective view schematically showing a fuel cell stack formed by stacking a plurality of fuel cells according to a first embodiment of the present invention.

As shown in FIG. 1, a fuel cell 10 according to a first embodiment of the present invention comprises a solid oxide fuel cell. A plurality of fuel cells 10 are stacked together in the direction indicated by the arrow A to thereby form a fuel cell stack 12. The fuel cell 10 is used in various applications, including stationary and mobile applications. For example, the fuel cell 10 may be mounted on a vehicle. As described later, the fuel cell 10 is a flat plate stacked type of solid oxide fuel cell.

Figure 2:
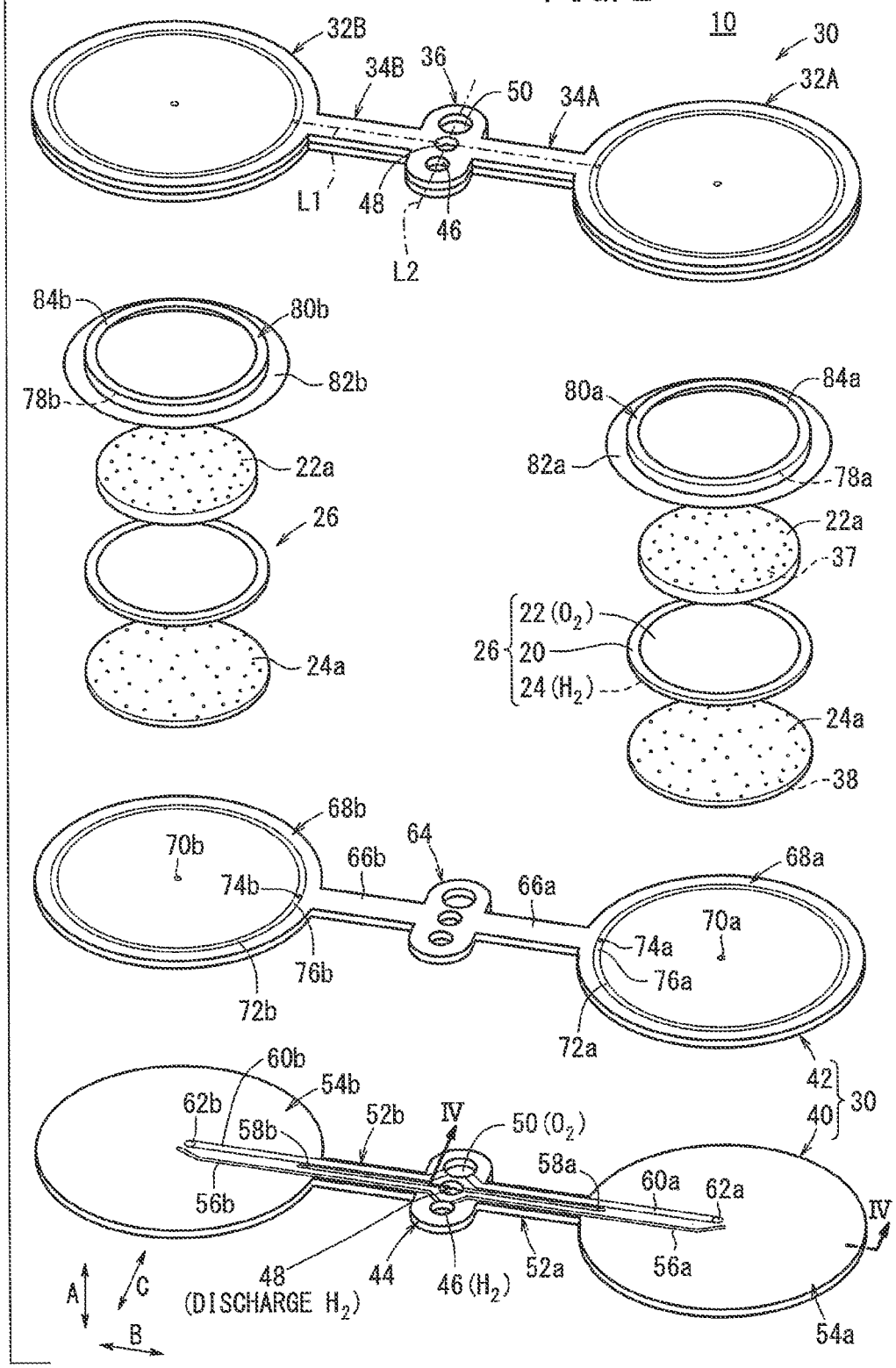
FIG. 2 is an exploded perspective view schematically showing the fuel cell stack.
Figure 3:
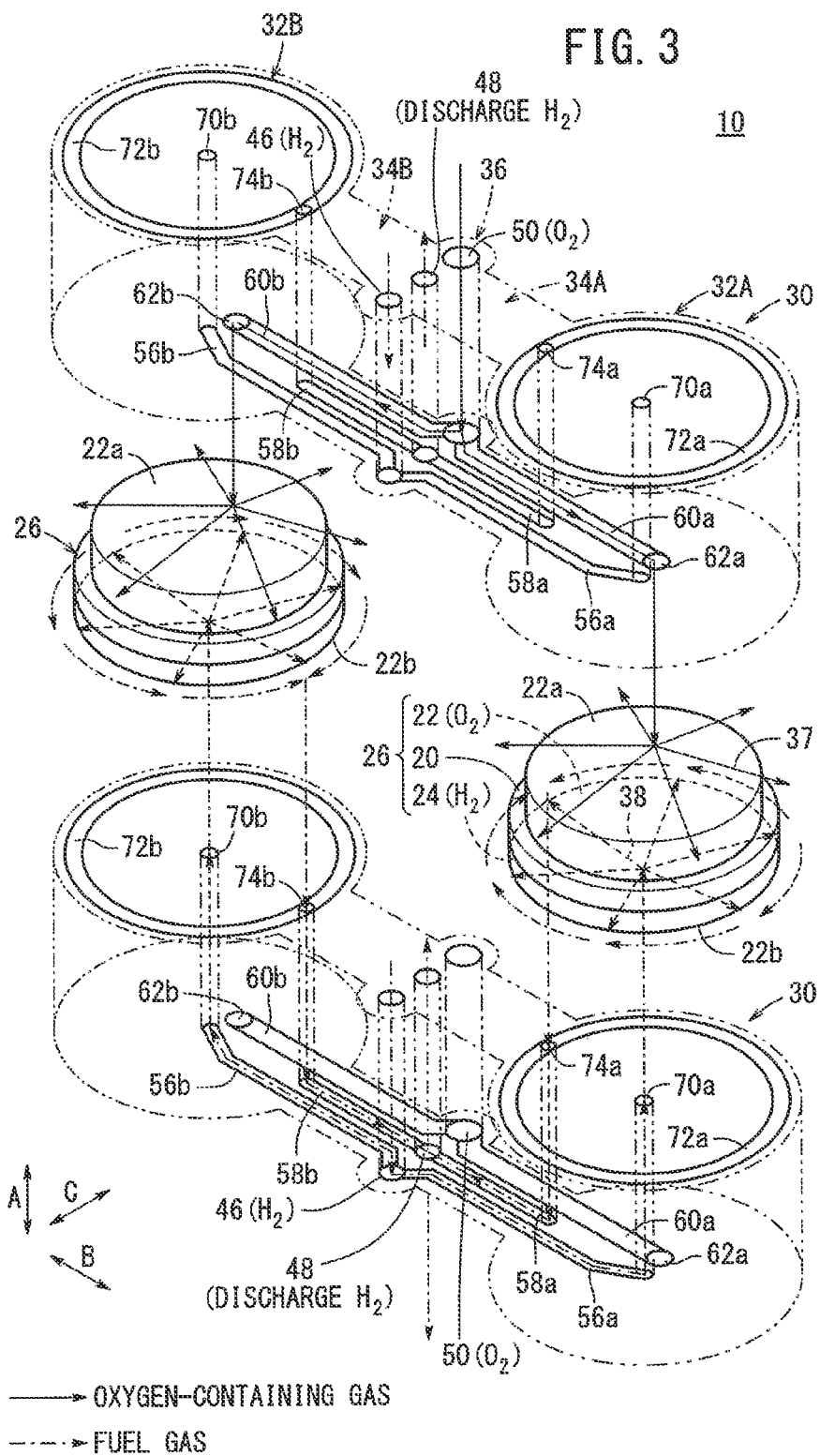
FIG. 3 is a partially exploded perspective view showing gas flows in the fuel cell.
Figure 4:
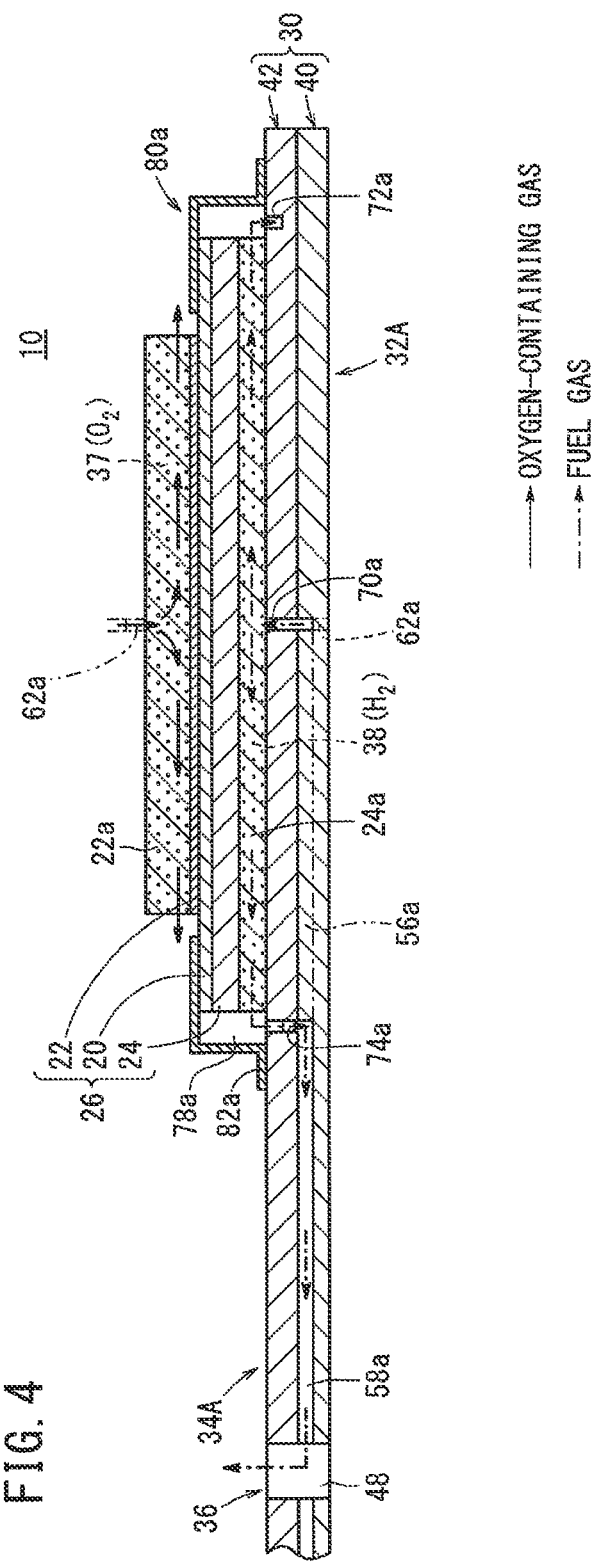
FIG. 4 is a cross sectional view taken along line IV-IV in FIG. 2 and showing the fuel cell.

As shown in FIGS. 2 to 4, the fuel cell 10 includes electrolyte electrode assemblies (MEA) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of an ion-conductive solid oxide such as stabilized zirconia. The electrolyte electrode assembly 26 has a circular disk shape. The diameter of the outer profile of the cathode 22 is smaller than the outer profile diameters of the electrolyte 20 and the anode 24.

The electrolyte electrode assembly 26 includes a circular disk shaped cathode current collector 22a, which contacts the cathode 22, and a circular disk shaped anode current collector 24a, which contacts the anode 24. For example, the cathode current collector 22a and the anode current collector 24a are made of foamed metal. The diameter of the cathode current collector 22a is smaller than the diameter of the anode current collector 24a.

The fuel cell 10 is formed by sandwiching two electrolyte electrode assemblies 26 between a pair of separators 30. The separators 30 each include sandwiching sections 32A, 32B for sandwiching the two electrolyte electrode assemblies 26 therebetween, narrow bridge sections 34A, 34B, and a reactant gas supply section 36. One end of the bridge section 34A is connected to the sandwiching section 32A, and the other end of the bridge section 34A is connected to the reactant gas supply section 36. One end of the bridge section 34B is connected to the sandwiching section 32B, and the other end of the bridge section 34B is connected to the reactant gas supply section 36.

The cathode current collector 22a is interposed between the sandwiching section 32A (32B) and the electrolyte electrode assembly 26, so as to form an oxygen-containing gas channel 37. The anode current collector 24a is interposed between the sandwiching section 32A (32B) and the electrolyte electrode assembly 26, so as to form a fuel gas channel 38.

For example, the separator 30 includes two plates, i.e., a first plate 40 and a second plate 42. The first plate 40 and the second plate 42 are metal plates made of, e.g., a stainless alloy, and which are joined to each other, for example, by brazing, diffusion bonding, or laser welding. The separator 30 may be formed by joining three or more plates.

Figure 5:
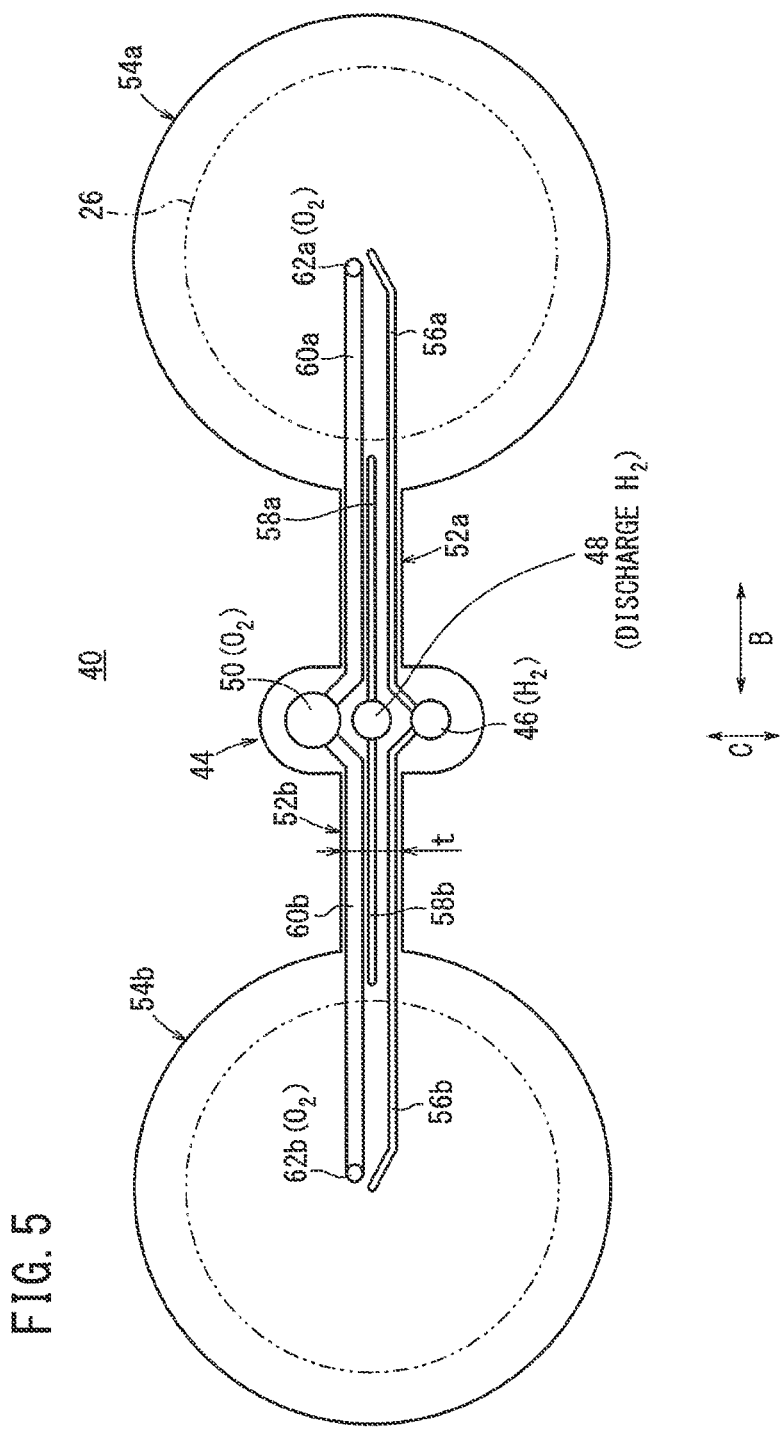
FIG. 5 is a plan view showing a separator of the fuel cell.

As shown in FIGS. 2 and 5, the first plate 40 includes a first reactant gas supply member 44 having an oval shape that forms part of the reactant gas supply section 36. A fuel gas supply passage 46 for supplying a fuel gas, a fuel gas discharge passage for discharging the fuel gas that has flowed through the fuel gas channel 38, and an oxygen-containing gas supply passage 50 for supplying an oxygen-containing gas extend respectively through the first reactant gas supply member 44, in the stacking direction indicated by the arrow A.

Cross sectional areas of the fuel gas supply passage 46, the fuel gas discharge passage 48, and the oxygen-containing gas supply passage 50 are determined based on the A/F (air-to-fuel) ratio. That is, the cross sectional area of the oxygen-containing gas supply passage 50 is larger than the cross sectional areas of the fuel gas supply passage 46 and the fuel gas discharge passage 48. Thus, a reduction in pressure loss of the oxygen-containing gas in pumps or the like can be achieved, and pressure losses are optimized. Accordingly, operating efficiency is improved.

In the reactant gas supply section 36, the fuel gas discharge passage 48 is formed between the fuel gas supply passage 46 and the oxygen-containing gas supply passage 50. As shown in FIG. 2, the fuel gas supply passage 46, the fuel gas discharge passage 48, and the oxygen-containing gas supply passage 50 are arranged in the direction indicated by the arrow C (along a virtual straight line L2) intersecting with (e.g., extending perpendicular to) a virtual straight line L1 (in the direction indicated by the arrow B) connecting centers of the sandwiching sections 32A, 32B and the bridge sections 34A, 34B.

As shown in FIG. 5, first sandwiching members 54a, 54b, each having a relatively large diameter, are formed integrally with both long sides of the first reactant gas supply member 44 through narrow first bridge members 52a, 52b. The fuel gas discharge passage 48 is formed at an inner position along the width direction (dimension t in the drawings) of the short side of the first bridge members 52a, 52b, and along the electrode surface. The fuel gas supply passage 46 and the oxygen-containing gas supply passage 50 are formed at outer positions along the width direction of the first bridge members 52a, 52b.

Each of a pair of fuel gas supply channels 56a, 56b has one end connected to the fuel gas supply passage 46, and the other end thereof extending into each of the first sandwiching members 54a, 54b and terminating at the center of each of the first sandwiching members 54a, 54b.

Each of a pair of fuel gas return channels 58a, 58b has one end connected to the fuel gas discharge passage 48, and the other end thereof extending to the outer circumferential portion of each of the first sandwiching members 54a, 54b, in the longitudinal direction of the first bridge members 52a, 52b, as indicated by the arrow B.

Each of a pair of oxygen-containing gas supply channels 60a, 60b has one end connected to the oxygen-containing gas supply passage 50, and the other end thereof extending into each of the first sandwiching members 54a, 54b, in the longitudinal direction of the first bridge members 52a, 52b, as indicated by the arrow B.

The cross sectional area of the oxygen-containing gas supply channel 60a (60b) is larger than the cross sectional areas of the fuel gas supply channel 56a (56b) and the fuel gas return channel 58a (58b). In this structure, pressure losses are optimized, and an improvement in operating efficiency is achieved.

In the first bridge member 52a (52b), the fuel gas return channel 58a (58b) is formed between the fuel gas supply channel 56a (56b) and the oxygen-containing gas supply channel 60a (60b).

The first sandwiching member 54a (54b) has a circular disk shape, and the diameter of the first sandwiching member 54a (54b) is larger than the diameter of the electrolyte electrode assembly 26. At least one oxygen-containing gas supply hole 62a (62b) for supplying the oxygen-containing gas is formed at a position deviated from the center of the first sandwiching member 54a (54b). The oxygen-containing gas supply hole 62a (62b) is connected to the other end of the oxygen-containing gas supply channel 60a (60b), and also is connected to the oxygen-containing gas supply passage 50 through the oxygen-containing gas supply channel 60a (60b).

As shown in FIG. 2, the second plate 42 has a second reactant gas supply member 64 having an oval shape as part of the reactant gas supply section 36. The fuel gas supply passage 46, the fuel gas discharge passage 48, and the oxygen-containing gas supply passage 50 extend respectively through the second reactant gas supply member 64. Second sandwiching members 68a, 68b, each having a relatively large diameter, are formed integrally with both of the long sides of the second reactant gas supply member 64, through narrow second bridge members 66a, 66b.

At least one fuel gas supply hole 70a (70b) for supplying the fuel gas is formed at the center of the second sandwiching member 68a (68b). The fuel gas supply hole 70a (70b) is connected to the other end of the fuel gas supply channel 56a (56b), and is connected to the fuel gas supply passage 46 through the fuel gas supply channel 56a (56b).

A fuel gas return groove 72a (72b) is formed around the outer circumferential portion of the electrolyte electrode assembly 26. At least one fuel gas return hole 74a (74b), which connects the fuel gas channel 38 and the fuel gas return channel 58a (58b), is connected to the fuel gas return groove 72a (72b). A bypass section 76a (76b) is formed in the second sandwiching member 68a (68b) in the thickness direction thereof, for allowing the fuel gas to flow through the fuel gas return hole 74a (74b) while bypassing the fuel gas supply channel 56a (56b) and the oxygen-containing gas supply channel 60a (60b).

The cross sectional area of the oxygen-containing gas supply hole 62a (62b) is larger than the cross sectional areas of the fuel gas supply hole 70a (70b) and the fuel gas return hole 74a (74b). Thus, pressure losses are optimized, and an improvement in operating efficiency is achieved.

As shown in FIGS. 2 and 4, a seal member (seal) 80a (80b) is provided in the sandwiching section 32A (32B). The seal member 80a (80b) seals a space 78a (78b), which is formed between the sandwiching section 32A (32B) and the anode 24 of the electrolyte electrode assembly 26. The seal member 80a, (80b) has a substantially annular shape, and includes a flange 82a (82b) fixed to the second sandwiching member 68a (68b) around the fuel gas return groove 72a (72b), and a presser member 84a (84b) formed around the cathode current collector 22a, which presses the outer circumference of the cathode 22 of each electrolyte electrode assembly 26.

As shown in FIG. 1, the fuel cell stack 12 includes an end plate 90 provided at one end of the fuel cells 10 in the stacking direction, and presser plates 92A, 92B and 94 provided at the other end of the fuel cells 10 in the stacking direction. The presser plates 92A, 92B are provided at positions corresponding to the sandwiching sections 32A, 32B, whereas the presser plate 94 is provided at a position corresponding to the reactant gas supply section 36.

By fixing a plurality of bolts 96 to the end plate 90, the presser plates 92A, 92B apply a relatively small tightening load in the stacking direction to the electrolyte electrode assemblies 26 and the sandwiching sections 32A, 32B, which are stacked in the stacking direction indicated by the arrow A. By fixing the end plate 90 to the presser plate 94 using a plurality of bolts 96, the presser plate 94 applies a relatively large tightening load in the stacking direction to components of the reactant gas supply section 36, which are stacked in the stacking direction indicated by the arrow A.

Although not shown, a pipe for supplying the fuel gas, a pipe for discharging the fuel gas that has been consumed once, and a pipe for supplying the oxygen-containing gas are provided at any one of the end plate 90 and the presser plates 92A, 92B and 94.

Operations of the fuel cell stack 12 will be described below.

As shown in FIGS. 2 and 3, a fuel gas such as a hydrogen-containing gas is supplied to the fuel gas supply passage 46, and an oxygen-containing gas (hereinafter also referred to as air) is supplied to the oxygen-containing gas supply passage 50. The fuel gas flows along the fuel gas supply passage 46 of the fuel cell stack 12, in the stacking direction indicated by the arrow A, and moves in parallel to surfaces of the separator 30 along the fuel gas supply channel 56a (56b) of each fuel cell 10.

The fuel gas from the fuel gas supply channel 56a (56b) flows through the fuel gas supply hole 70a (70b) formed in the second sandwiching member 68a (68b) and into each fuel gas channel 38.

The fuel gas supply hole 70a (70b) is provided at a substantially central position of the anode 24 of the electrolyte electrode assembly 26. In this structure, the fuel gas is supplied substantially to the center of the anode 24 from the fuel gas supply hole 70a (70b), and the fuel gas moves along the fuel gas channel 38 from a substantially central region to an outer circumferential region of the anode 24.

As shown in FIGS. 3 and 4, fuel gas consumed in the fuel gas channel 38 flows into the fuel gas return groove 72a (72b), which is formed around the outer circumference of the electrolyte electrode assembly 26, and the fuel gas is guided by the fuel gas return groove 72a (72b) toward the fuel gas return hole 74a (74b). Thus, the fuel gas flows through the fuel gas return hole 74a (74b) and is supplied to the fuel gas return channel 58a (58b). The fuel gas is discharged from the fuel gas return channel 58a (58b) into the fuel gas discharge passage 48.

Meanwhile, air moves along the oxygen-containing gas supply passage 50 of the fuel cell stack 12, in the stacking direction indicated by the arrow A, and the oxygen-containing gas moves in parallel to surfaces of the separator 30 of the oxygen-containing gas supply channel 60a (60b) within each fuel cell 10 (see FIGS. 2 and 3).

Air from the oxygen-containing gas supply channel 60a (60b) flows through the oxygen-containing gas supply hole 62a (62b) formed in the first sandwiching member 54a (54b) and into each oxygen-containing gas channel 37. The oxygen-containing gas supply hole 62a (62b) is provided at a substantially central position of the cathode 22 of the electrolyte electrode assembly 26. In this structure, air is supplied substantially to the center of the cathode 22 from the oxygen-containing gas supply hole 62a (62b), and the air moves along the oxygen-containing gas channel 37 from a substantially central region to an outer circumferential region of the cathode 22.

Thus, in each of the electrolyte electrode assemblies 26, fuel gas is supplied from a central region to the outer circumferential region of the electrode surface of the anode 24, and air is supplied from a central region to the outer circumferential region of the electrode surface of the cathode 22. At this time, oxygen ions flow through the electrolyte 20 toward the anode 24, and electricity is generated by electrochemical reactions.

In the first embodiment, the fuel gas supply passage 46, the fuel gas discharge passage 48, and the oxygen-containing gas supply passage 50, as components of the manifold, are all provided in a single reactant gas supply section 36. In this structure, the components of the manifold (the fuel gas supply passage 46, the fuel gas discharge passage 48, and the oxygen-containing gas supply passage 50), which require a high load for gas sealing, are not positioned distantly from one another. Thus, it becomes possible to suppress insofar as possible the occurrence of distortion in the separators 30 due to heat expansion or heat contraction.

Further, failures in tight contact between the separator 30 and the electrolyte electrode assembly 26 due to such distortion are suppressed, and an improvement in power generation performance is achieved. Moreover, since damage of the electrolyte electrode assembly 26 due to distortion is suppressed, durability of the electrolyte electrode assembly 26 is suitably improved.

Further, the fuel gas supply passage 46, the fuel gas discharge passage 48, and the oxygen-containing gas supply passage 50 are provided in the reactant gas supply section 36, which serves as a reactant gas manifold. Also, the fuel gas supply channels 56a, 56b, the fuel gas return channels 58a, 58b, and the oxygen-containing gas supply channels 60a, 60b are formed in the bridge sections 34A, 34B. In this structure, the fuel gas and the oxygen-containing gas as supplied gases tend to become heated easily as a result of the hot fuel gas. Thus, a thermally self-sustaining operation can be facilitated, i.e., the operating temperature of the fuel cell can be maintained solely due to heat produced in the fuel cell itself, without requiring any heat from the outside. Therefore, an improvement in heat efficiency can advantageously be achieved.

Further, in the first embodiment, the fuel gas discharge passage 48 is formed between the fuel gas supply passage 46 and the oxygen-containing gas supply passage 50, while the fuel gas supply passage 46, the fuel gas discharge passage 48, and the oxygen-containing gas supply passage 50 are arranged in a direction along a virtual straight line (L2) that intersects with a virtual straight line L1 interconnecting centers of the sandwiching sections 32A, 32B and the bridge sections 34A, 34B (see FIG. 2).

In this structure, the fuel gas and the oxygen-containing gas as supplied gases are heated by the hot fuel gas that moves through the fuel gas discharge passage 48 and which has flowed through the fuel gas channel 38. Thus, a thermally self-sustaining operation can be facilitated, and an improvement in heat efficiency can advantageously be achieved.

Further, in the reactant gas supply section 36, the fuel gas discharge passage 48 is provided at an inner position in the width direction, on the short side of the bridge sections 34A, 34B along the electrode surfaces, while the fuel gas supply passage 46 and the oxygen-containing gas supply passage 50 are provided at outer positions in the width direction of the bridge sections 34A, 34B.

In this structure, the width of the bridge sections 34A, 34B is suitably shortened, and a desired load is reliably and independently applied to the sandwiching sections 32A, 32B and the reactant gas supply section 36.

Further, the fuel gas return channel 58a (58b) is provided in the bridge section 34A (34B) between the fuel gas supply channel 56a (56b) and the oxygen-containing gas supply channel 60a (60b). In this structure, the fuel gas and the oxygen-containing gas as supplied gases are heated by hot fuel gas that has flowed through the fuel gas channel 38. Thus, a thermally self-sustaining operation can be facilitated, and an improvement in heat efficiency can advantageously be achieved.

Further, at least one fuel gas supply hole 70a (70b) connecting the fuel gas channel 38 and the fuel gas supply channel 56a (56b) is formed in the sandwiching section 32A (32B). The number of the fuel gas supply holes 70a (70b) can be determined depending on the surface area of the electrolyte electrode assembly 26. Therefore, concentration of fuel gas on the electrode surface of the electrolyte electrode assembly 26 is made uniform, and depletion of the fuel gas can be suppressed.

Further, at least one oxygen-containing gas supply hole 62a (62b) connecting the oxygen-containing gas channel 37 and the oxygen-containing gas supply channel 60a (60b) is formed in the sandwiching section 32A (32B). The number of oxygen-containing gas supply holes 62a (62b) can be determined depending on the surface area of the electrolyte electrode assembly 26. Therefore, concentration of oxygen-containing gas on the electrode surface of the electrolyte electrode assembly 26 is made uniform, and depletion of air can be suppressed.

Further, at least one fuel gas return hole 74a (74b) connecting the fuel gas channel 38 and the fuel gas return channel 58a (58b) is formed in the sandwiching section 32A (32B). In this structure, fuel gas can be returned smoothly and reliably from each fuel gas channel 38 to the fuel gas return channel 58a (58b). Therefore, concentration of fuel gas on the electrode surface of the electrolyte electrode assembly 26 is made uniform.

Further, the fuel gas return groove 72a (72b), which guides the fuel gas supplied to the fuel gas channel 38 to the fuel gas return hole 74a (74b), is provided at an outer circumferential portion of the sandwiching section 32A, 32B. In this structure, fuel gas that has flowed through the fuel gas channel 38 is guided smoothly and reliably from the fuel gas return groove 72a (72b) to the fuel gas return hole 74a (74b), whereby return of the fuel gas is carried out efficiently.

Further, the bypass section 76a, (76b) is provided in the fuel gas return groove 72a (72b) in the thickness direction of the sandwiching section 32A (32B), for thereby allowing fuel gas to flow through the fuel gas return hole 74a (74b) while bypassing the fuel gas supply channel 56a (56b) and the oxygen-containing gas supply channel 60a (60b). Thus, with a compact structure, respective channels for the fuel gas, the oxygen-containing gas, and the returning fuel gas can be provided easily and reliably.

Further, the seal member 80a (80b) is provided, which is in tight contact with the outer circumferential portions of the separator 30 and the electrolyte electrode assembly 26. The seal member 80a (80b) seals the space 78a (78b) formed between the separator 30 and the anode 24 of the electrolyte electrode assembly 26. Thus, leakage of fuel gas to the outside of the electrolyte electrode assembly 26 does not occur, and entry of fuel gas from the outside of the electrolyte electrode assembly 26 toward the cathode 22 can be prevented. In this structure, degradation in power generation performance due to a reduction in fuel gas at the cathode 22 is prevented, and an improvement in durability of the separator 30 and the electrolyte electrode assembly 26 can be achieved.

Further, entry of oxygen-containing gas into the anode 24 from outside of the electrolyte electrode assembly 26 is prevented. Thus, degradation in power generation performance, in particular due to oxidation at the anode, is prevented. In this structure, an improvement in durability of the separator 30 and the electrolyte electrode assembly 26 is achieved.

Further, the fuel cell 10 is a solid oxide fuel cell, which is operated at high temperatures. Heat distortion or the like of the sandwiching sections 32A, 32B and the electrolyte electrode assemblies 26 due to unwanted heat stress can suitably be suppressed.

Moreover, the fuel cell 10 is a flat plate stacked type of solid oxide fuel cell. Therefore, the fuel cell 10 can suitably be used as a hot temperature type of fuel cell, such as a flat plate type solid oxide fuel cell (SOFC).

Figure 6:
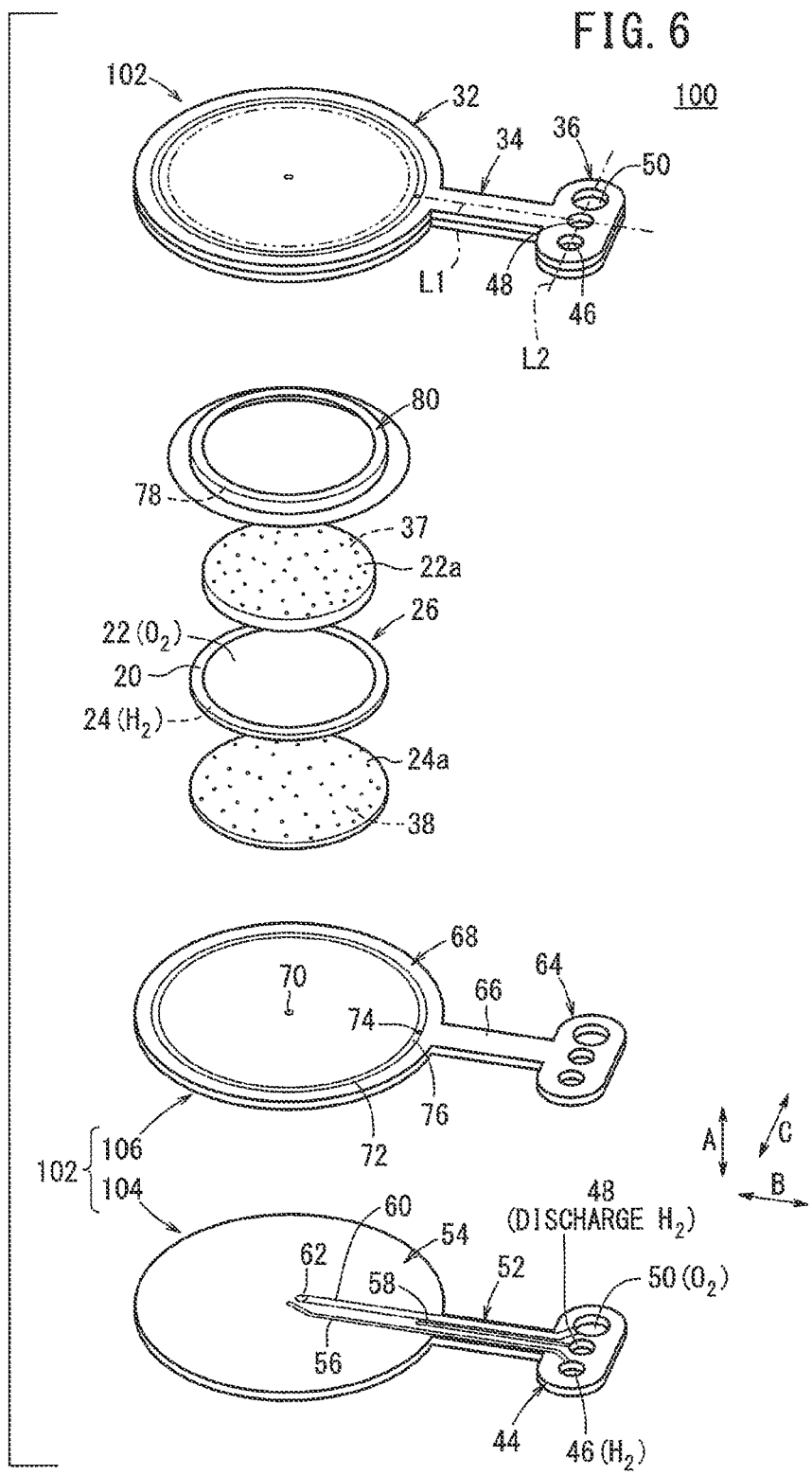
FIG. 6 is an exploded perspective view showing a fuel cell according to a second embodiment of the present invention.

FIG. 6 is an exploded perspective view showing a fuel cell 100 according to a second embodiment of the present invention. The constituent elements thereof, which are identical to those of the fuel cell 10 according to the first embodiment, are labeled with the same reference numerals, and descriptions of such features will be omitted. Also, in a third embodiment, to be described later, the constituent elements thereof, which are identical to those of the fuel cell 10 according to the first embodiment, are labeled with the same reference numerals, and descriptions of such features will be omitted.

The fuel cell 100 is formed by sandwiching a single electrolyte electrode assembly 26 between a pair of separators 102. Each of the separators 102 includes a sandwiching section 32, a narrow bridge section 34, and a reactant gas supply section 36. One end of the narrow bridge section 34 is connected to the sandwiching section 32, whereas the other end of the narrow bridge section 34 is connected to the reactant gas supply section 36.

The separator 102 includes two plates, for example, a first plate 104 and a second plate 106. A first reactant gas supply member 44, a narrow first bridge member 52, and a first sandwiching member 54 are provided integrally to thereby form the first plate 104. A fuel gas supply channel 56, a fuel gas return channel 58, and an oxygen-containing gas supply channel 60 are formed in the first bridge member 52. An oxygen-containing gas supply hole 62 is formed in the first sandwiching member 54.

A second reactant gas supply member 64, a narrow second bridge member 66, and a second sandwiching member 68 are provided integrally to thereby form the second plate 106. A fuel gas supply hole 70, a fuel gas return groove 72, a fuel gas return hole 74, and a bypass section 76 are formed in the second sandwiching member 68.

A seal member 80 is provided in the sandwiching section 32. The seal member 80 seals a space 78, which is formed between the sandwiching section 32 and the anode 24 of the electrolyte electrode assembly 26.

The cross sectional area of the oxygen-containing gas supply channel 60 is larger than the cross sectional areas of the fuel gas supply channel 56 and the fuel gas return channel 58. The cross sectional area of the oxygen-containing gas supply hole 62 is larger than the cross sectional areas of the fuel gas supply hole 70 and the fuel gas return hole 74.

In the second embodiment, a single electrolyte electrode assembly 26 is sandwiched between the separators 102. Additionally, the same advantages as those of the first embodiment are obtained.

Figure 7:
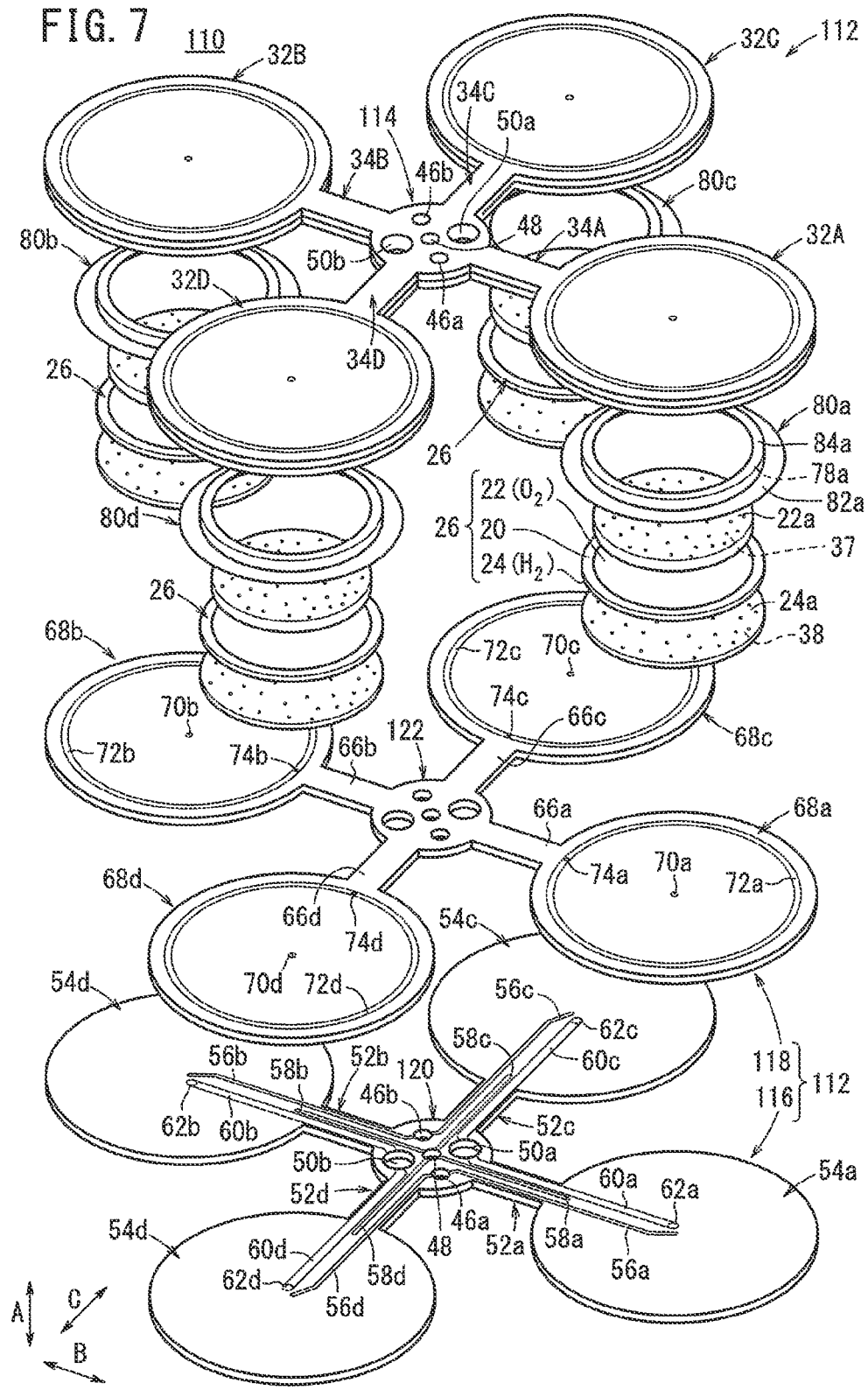
FIG. 7 is an exploded perspective view showing a fuel cell according to a third embodiment of the present invention.

FIG. 7 is an exploded perspective view showing a fuel cell 110 according to a third embodiment of the present invention.

The fuel cell 110 is formed by stacking four electrolyte electrode assemblies 26 between a pair of separators 112. The four electrolyte electrode assemblies 26 are arranged concentrically around the reactant gas supply section 114 at the center of the separator 112.

Figure 8:
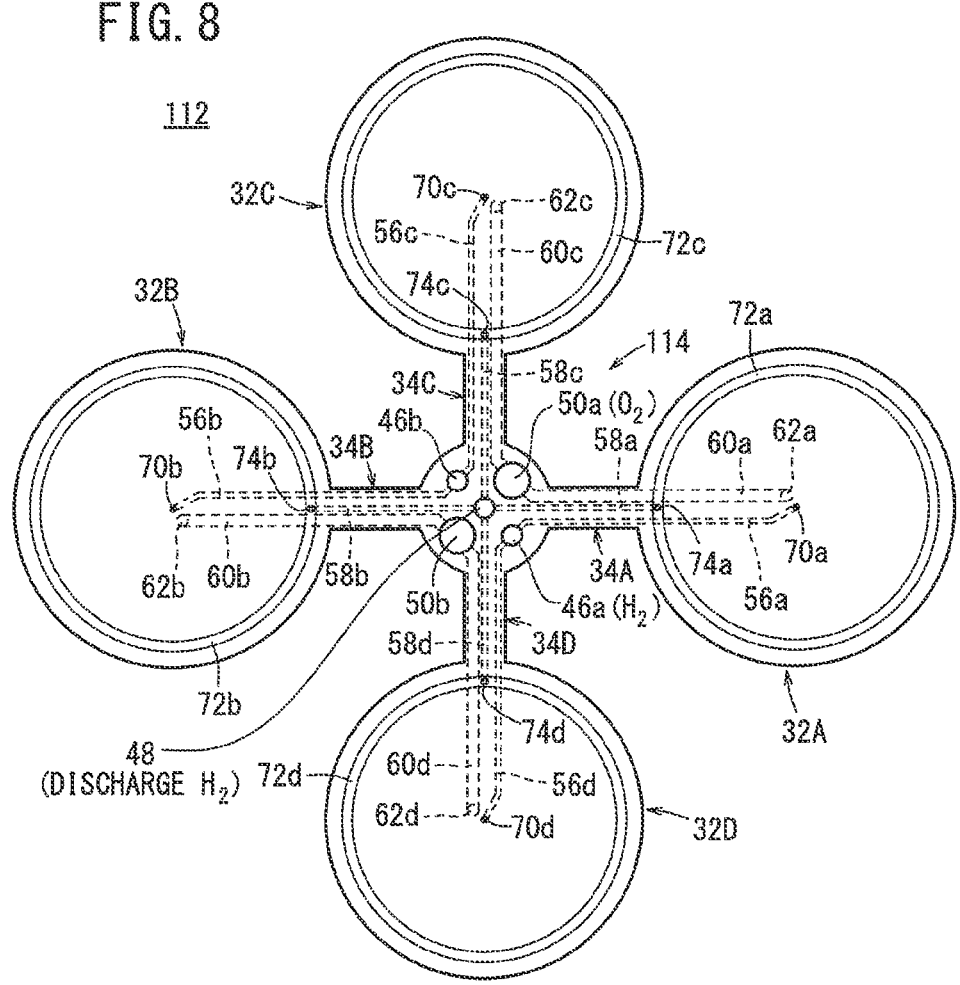
FIG. 8 is a plan view showing a separator of the fuel cell.
Figure 9:
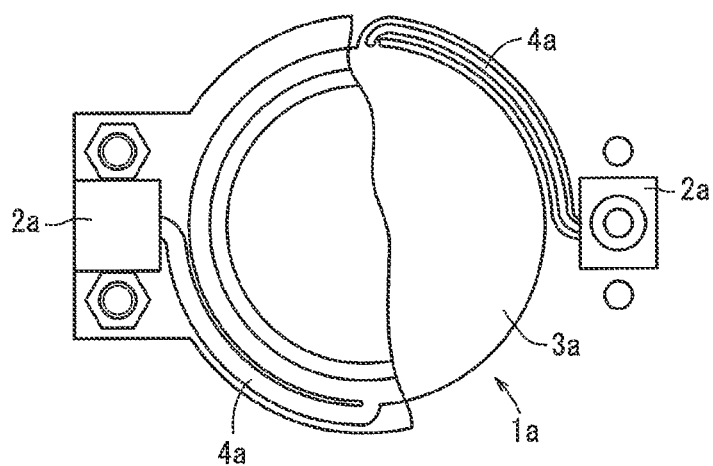
FIG. 9 is a view showing a fuel cell as disclosed in Japanese Laid-Open Patent Publication No. 2006-120589.
Figure 10:
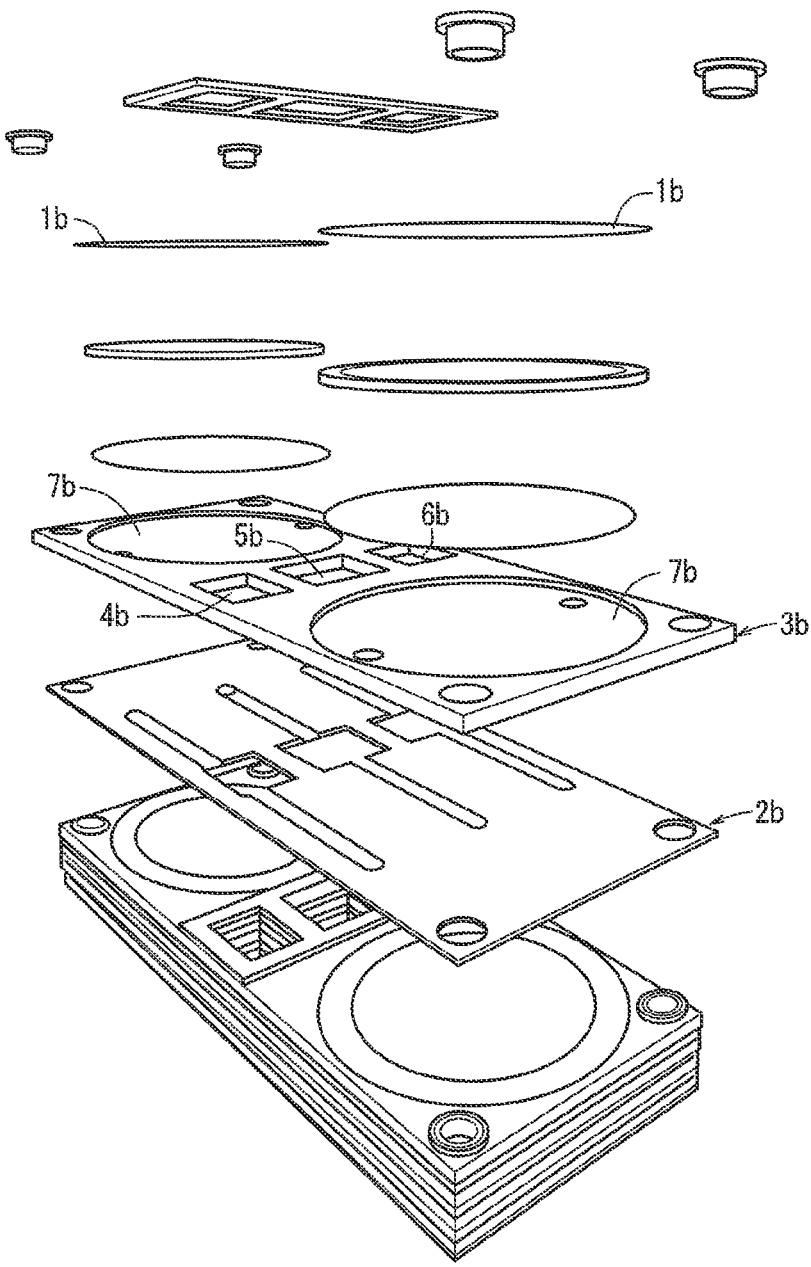
FIG. 10 is an exploded perspective view showing a fuel cell stack as disclosed in Japanese Laid-Open Patent Publication No. 2007-317594.
Figure 11:
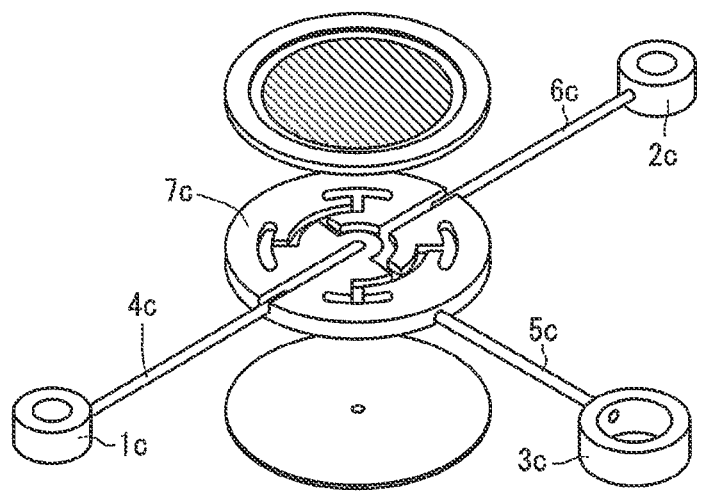
FIG. 11 is a perspective view showing a separator as disclosed in Japanese Laid-Open Patent Publication No. 2007-329063.

As shown in FIGS. 7 and 8, the separator 112 includes sandwiching sections 32A, 32B, 32C and 32D for sandwiching the four electrolyte electrode assemblies 26, narrow bridge sections 34A, 34B, 34C and 34D, and a reactant gas supply section 114. Each of the bridge sections 34A, 34B, 34C and 34D has one end thereof connected to the sandwiching section 32A, 32B, 32C and 32D, and another end thereof connected to the reactant gas supply section 114.

The separator includes two plates, for example, a first plate 116 and a second plate 118. The first plate 116 includes a first reactant gas supply member 120 having a circular shape that forms part of the reactant gas supply section 114. Four narrow first bridge members 52a, 52b, 52c and 52d are provided integrally with the first reactant gas supply member 120 at equal intervals (angles of 90°). First sandwiching members 54a, 54b, 54c and 54d, each having a relatively large diameter, are provided integrally with the first bridge members 52a, 52b, 52c and 52d.

A fuel gas discharge passage 48 extends through the center of the first reactant gas supply member 120. The fuel gas supply passages 46a, 46b and the oxygen-containing gas supply passages 50a, 50b extend respectively through the first reactant gas supply member 120, at diagonal positions outside of the fuel gas discharge passage 48. The fuel gas supply passage 46a is formed between the first bridge members 52a, 52d, the fuel gas supply passage 46b is formed between the first bridge members 52b, 52c, the oxygen-containing gas supply passage 50a is formed between the first bridge members 52a, 52c, and the oxygen-containing gas supply passage 50b is formed between the first bridge members 52b, 52d.

A fuel gas supply channel 56a (56b, 56c, 56d), a fuel gas return channel 58a (58b, 58c, 58d), and an oxygen-containing gas supply channel 60a (60b, 60c, 60d) are formed in the first bridge member 52a (52b, 52c, 52d). One end of the fuel gas supply channel 56a (56d) is connected to the fuel gas supply passage 46a, and one end of the fuel gas supply channel 56b (56c) is connected to the fuel gas supply passage 46b. Further, one end of the oxygen-containing gas supply channel 60a (60c) is connected to the oxygen-containing gas supply passage 50a, and one end of the oxygen-containing gas supply channel 60b (60d) is connected to the oxygen-containing gas supply passage 50b.

The oxygen-containing gas supply hole 62a (62b, 62c, 62d) is formed in the first sandwiching member 54a (54b, 54c, 54d). The other end of the oxygen-containing gas supply channel 60a (60b, 60c, 60d) is connected to the oxygen-containing gas supply hole 62a (62b, 62c, 62d).

The second plate 118 includes a second reactant gas supply member 122 having a circular shape, which forms a part of the reactant gas supply section 114. Four narrow second bridge members 66a, 66b, 66c and 66d are provided integrally with the second reactant gas supply member 122 at equal intervals (angles of 90°). Second sandwiching members 68a, 68b, 68c and 68d, each having a relatively large diameter, are provided integrally with the second bridge members 66a, 66b, 66c and 66d.

A fuel gas supply hole 70a, (70b, 70c, 70d) is formed at the center of the second sandwiching member 68a (68b, 68c, 68d). The other end of the fuel gas supply channel 56a (56b, 56c, 56d) is connected to the fuel gas supply hole 70a (70b, 70c, 70d). A fuel gas return groove 72a (72b, 72c, 72d), a fuel gas return hole 74a (74b, 74c, 74d), and a bypass section 76a (76b, 76c, 76d) are provided respectively in the second sandwiching member 68a (68b, 68c, 68d).

The cross sectional area of the oxygen-containing gas supply passages 50a, 50b is both larger than the cross sectional area of the fuel gas supply passages 46a, 46b and larger than the cross sectional area of the fuel gas discharge passage 48. The cross sectional area of the oxygen-containing gas supply channels 60a, 60b is both larger than the cross sectional area of the fuel gas supply channels 56a, 56b and larger than the cross sectional area of the fuel gas return channels 58a, 58b. The cross sectional area of the oxygen-containing gas supply holes 62a, 62b is both larger than the cross sectional area of the fuel gas supply holes 70a, 70b and larger than the cross sectional area of the fuel gas return holes 74a, 74b.

In the third embodiment, four electrolyte electrode assemblies 26 are sandwiched between the separators 112. The same advantages as those of the first and second embodiments are obtained.

Although certain preferred embodiments of the present invention have been shown and described in detail, it should be understood that various changes and modifications may be made therein without departing from the scope of the appended claims.

The invention claimed is:

1. A fuel cell formed by stacking an electrolyte electrode assembly between separators, the electrolyte electrode assembly including an anode, a cathode, and an electrolyte interposed between the anode and the cathode,
the separators each including:
a sandwiching section for sandwiching the electrolyte electrode assembly, a fuel gas channel for supplying a fuel gas along an electrode surface of the anode, and an oxygen-containing gas channel for supplying an oxygen-containing gas along an electrode surface of the cathode being provided separately in the sandwiching section;
a bridge section connected to the sandwiching section, wherein a fuel gas supply channel for supplying the fuel gas to the fuel gas channel, a fuel gas return channel for returning the fuel gas that has flowed through the fuel gas channel, and an oxygen-containing gas supply channel for supplying the oxygen-containing gas to the oxygen-containing gas channel are formed in the bridge section; and
a reactant gas supply section connected to the bridge section, wherein a fuel gas supply passage for supplying the fuel gas to the fuel gas supply channel, a fuel gas discharge passage for discharging the fuel gas that has flowed through the fuel gas return channel, and an oxygen-containing gas supply passage for supplying the oxygen-containing gas to the oxygen-containing gas supply channel extend in a stacking direction through the reactant gas supply section.

2. The fuel cell according to claim 1, wherein the fuel gas discharge passage is formed in the reactant gas supply section between the fuel gas supply passage and the oxygen-containing gas supply passage; and
the fuel gas supply passage, the fuel gas discharge passage, and the oxygen-containing gas supply passage are arranged in a direction intersecting a virtual straight line connecting the center of the sandwiching section and the bridge section.

3. The fuel cell according to claim 1, wherein the fuel gas discharge passage is formed in the reactant gas supply section at an inner position in the widthwise direction of a short side of the bridge section along the electrode surface, and the fuel gas supply passage and the oxygen-containing gas supply passage are formed in the reactant gas supply section at outer positions in the widthwise direction of the bridge section.

4. The fuel cell according to claim 1, wherein the fuel gas return channel is provided in the bridge section between the fuel gas supply channel and the oxygen-containing gas supply channel.

5. The fuel cell according to claim 1, wherein at least one fuel gas supply hole interconnecting the fuel gas channel and the fuel gas supply channel is formed in the sandwiching section.

6. The fuel cell according to claim 1, wherein at least one oxygen-containing gas supply hole interconnecting the oxygen-containing gas channel and the oxygen-containing gas supply channel is formed in the sandwiching section.

7. The fuel cell according to claim 1, wherein at least one fuel gas return hole interconnecting the fuel gas channel and the fuel gas return channel is formed in the sandwiching section.

8. The fuel cell according to claim 7, wherein a fuel gas return groove, for guiding the fuel gas supplied to the fuel gas channel to the fuel gas return hole, is formed in an outer circumferential portion of the sandwiching section.

9. The fuel cell according to claim 8, wherein, in the fuel gas return groove, a bypass section is provided in a thickness direction of the sandwiching section for allowing the fuel gas to flow through the fuel gas return hole while bypassing the fuel gas supply channel and the oxygen-containing gas supply channel.

10. The fuel cell according to claim 1, wherein a seal member is provided in tight contact with outer circumferential portions of the separator and the electrolyte electrode assembly, for sealing a space formed between the separator and the anode of the electrolyte electrode assembly.

11. The fuel cell according to claim 1, wherein the fuel cell is a solid oxide fuel cell.

12. The fuel cell according to claim 11, wherein the solid oxide fuel cell is a flat plate stacked type of solid oxide fuel cell.

13. The fuel cell according to claim 1, wherein the sandwiching section is spaced from the reactant gas supply section with the bridge section interposed therebetween.

14. The fuel cell according to claim 13, wherein each separator includes a single reactant gas supply section in which the fuel gas supply passage, the fuel gas discharge passage, and the oxygen-containing gas supply passage are formed.

15. The fuel cell according to claim 1, wherein each separator includes a single reactant gas supply section in which the fuel gas supply passage, the fuel gas discharge passage, and the oxygen-containing gas supply passage are formed.

* * * * *